(12) United States Patent
Hara et al.

(10) Patent No.: US 11,977,949 B2
(45) Date of Patent: May 7, 2024

(54) CARD READER

(71) Applicant: NIDEC SANKYO CORPORATION, Nagano (JP)

(72) Inventors: Ryota Hara, Nagano (JP); Masaya Fujimoto, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 18/070,661

(22) Filed: Nov. 29, 2022

(65) Prior Publication Data

US 2023/0169283 A1 Jun. 1, 2023

(30) Foreign Application Priority Data

Nov. 30, 2021 (JP) ................................. 2021-193939

(51) Int. Cl.
*G06K 7/10* (2006.01)
*G06K 7/14* (2006.01)

(52) U.S. Cl.
CPC ..... *G06K 7/10722* (2013.01); *G06K 7/10366* (2013.01); *G06K 7/1413* (2013.01); *G06K 7/1417* (2013.01)

(58) Field of Classification Search
CPC .................. G06K 7/10366; G06K 7/10722
USPC ............................................................. 235/451
See application file for complete search history.

(56) References Cited

FOREIGN PATENT DOCUMENTS

| JP | 2020113789 A | 1/2020 | |
|----|----|----|----|
| JP | 2021057725 A | 4/2021 | |
| WO | WO-2004008385 A1 * | 1/2004 | ........... G06K 13/063 |

* cited by examiner

*Primary Examiner* — Toan C Ly
(74) *Attorney, Agent, or Firm* — CANTOR COLBURN LLP

(57) ABSTRACT

A card reader includes a card reader main body, a board which is fixed to the card reader main body, a light emitting element which is disposed on a surface of the board, a cover member which is made of light transmissive material and covers the board from an opposite side to the card reader main body, and a code imaging part which images a one-dimensional code or a two-dimensional code. The cover member is formed with a card insertion port, and the code imaging part is held by the cover member and is disposed at a position adjacent to the card insertion port in a longitudinal direction of the card insertion port.

13 Claims, 5 Drawing Sheets

CARD READER

CROSS REFERENCE TO RELATED APPLICATION

The present invention claims priority under 35 U.S.C. § 119 to Japanese Application No. 2021-193939 filed Nov. 30, 2021, the entire content of which is incorporated herein by reference.

TECHNICAL FIELD

At least an embodiment of the present invention may relate to a card reader provided with a card insertion port.

BACKGROUND

In Japanese Patent Laid-Open No. 2021-57725 (Patent Literature 1), a card reader is disclosed in which a magnetic card or a contact type IC (Integrated Circuit) card is inserted from a card insertion port into an inside of the device to perform reading and writing of information to the card. The card reader is structured so that it can be used as a non-contact type information processing device which is capable of reading information from a non-contact type IC card or a smart phone by non-contact communication such as NFC (Near Field Communication: short-range wireless communication).

The non-contact type information processing device described in Patent Literature 1 is structured so that a periphery of a card insertion port is made to emit light. Therefore, LEDs (Light-Emitting Diodes) are mounted on a circuit board which is provided with a long and thin opening corresponding to the card insertion port, and a bezel (cover member) attached so as to cover the circuit board is provided with the card insertion port. Therefore, the entire bezel is illuminated so as to emit diffused light by energization to the LEDs and thus, visibility of the card insertion port is improved, and a presentation effect is obtained. The circuit board is mounted with a circuit connected with the LEDs and a circuit provided with a loop antenna for reading information by non-contact communication.

As a means for reading information in a non-contact manner, in addition to NFC, a means is used for reading a two-dimensional code such as a QR (Quick Response) code (registered trademark), a one-dimensional code such as a bar-code or the like. However, the device described in Patent Literature 1 does not include a means for reading a two-dimensional code or a one-dimensional code. Commonly, a handy type code imaging device is used as a means for reading a two-dimensional code or a one-dimensional code, but it is required to operate by hand and is not easily used. Therefore, it has been proposed that a fixed type code imaging part is provided at a periphery of the card insertion port.

However, when a fixed type code imaging part is provided in a bezel, a size of the bezel formed with a card insertion port is increased and thus, an outer shape of a card reader may be enlarged. In such a case, it is difficult to add a code imaging part to an existing card reader and thus, it is difficult to add a reading function of a two-dimensional code or a one-dimensional code to the existing card reader.

For example, in Japanese Patent Application No. 2020-112496, the present applicant proposes a card reader which is provided with a fixed type code imaging part on a lower side with respect to a card insertion port. However, in the structure of Patent Literature 1, when a code imaging part is added at such a position, a height in the upper and lower direction of a bezel is increased and thus, an outer shape of the card reader is increased, which largely affects an opposite-side apparatus (game apparatus or the like) to which the card reader is fitted. Therefore, it is difficult to add a code imaging part to the card reader.

SUMMARY

In view of the problem described above, at least an embodiment of the present invention may advantageously provide a card reader which is capable of easily reading a two-dimensional code and a one-dimensional code and, in addition, influence of a code imaging part is reduced which is added to an existing card reader structured to illuminate a periphery of a card insertion port.

According to at least an embodiment of the present invention, there may be provided a card reader including a card reader main body, a board which is fixed to the card reader main body, a light emitting element which is disposed on a surface of the board, a cover member which is made of light transmissive material and covers the board from an opposite side to the card reader main body, and a code imaging part which images a one-dimensional code or a two-dimensional code. The cover member is formed with a card insertion port, and the code imaging part is held by the cover member and is disposed at a position adjacent to the card insertion port in a longitudinal direction of the card insertion port.

In this embodiment, the cover member provided with the card insertion port is formed of a light transmissive material, and the board disposed with the light emitting element is disposed on an inner side of the cover member. Therefore, a periphery of the card insertion port can be illuminated. Further, in this embodiment, the code imaging part is held in the cover member at a position adjacent to the card insertion port in the longitudinal direction. In a case that the code imaging part is disposed at such a position, the code imaging part can be easily recognized and, when a one-dimensional code or a two-dimensional code is to be read, a medium is easily held over the code imaging part. Further, when the above-mentioned arrangement is adopted, an arrangement space of the code imaging part can be secured only by shifting a position of the slit-shaped card insertion port in the longitudinal direction and thus, there is little influence on an outer shape of the cover member. Further, it is sufficient that structures of the board mounted with the light emitting element and the card reader main body are only changed so as to shift to a side to which the card insertion port is shifted. Therefore, there is little influence on an outer shape of the card reader, and there is little influence on an apparatus on which the card reader is mounted. Accordingly, influence of the code imaging part added to an existing card reader can be reduced.

In this embodiment, it is preferable that the code imaging part includes a camera module and a light emitting part, and the light emitting part and the camera module are arranged in the longitudinal direction. According to this structure, a dimension of the code imaging part in a direction perpendicular to the longitudinal direction is easily made small. Therefore, influence on an outer shape of the cover member can be reduced.

In this embodiment, it is preferable that the light emitting part is disposed on an opposite side in the longitudinal direction to the card insertion port with respect to the camera module. According to this structure, the light emitting part can be separated from the card insertion port and thus, when a user in front of the card insertion port utilizes the code imaging part to set a one-dimensional code or a two-dimensional code to read, the user is hard to feel dazzled by the light of the light emitting part.

In this embodiment, it is preferable that an optical axis of the camera module, a center of the light emitting part and a center of the card insertion port are aligned on the same straight line. According to this structure, a dimension of the cover member in a direction perpendicular to the longitudinal direction is easily reduced. Therefore, influence on an outer shape of the cover member can be reduced.

In this embodiment, it is preferable that the card reader includes a non-contact communication antenna which is disposed on a surface of the board. According to this structure, both of reading of information by NFC (short-range wireless communication) and reading of a one-dimensional code and a two-dimensional code can be performed and thus, a highly convenient card reader is obtained.

In this embodiment, it is preferable that the card reader includes a first flexible printed circuit board having a first portion which surrounds a card passage port provided in the board, and the non-contact communication antenna is provided in the first portion. According to this structure, the antenna is easily arranged.

In this case, it is preferable that the light emitting element is connected with a control circuit board provided in the card reader main body through the first flexible printed circuit board. According to this structure, arrangement of the antenna and wiring connection with the light emitting element can be performed by using a common flexible printed circuit board. Therefore, wiring connection with a light emitting function and the antenna is easily performed and easiness of assembling is enhanced.

Further, in this embodiment, it is preferable that the first flexible printed circuit board is provided with a second portion which connects the first portion with the light emitting part, and a third portion which is connected with the card reader main body, and the light emitting part is connected with the control circuit board through the second portion and the third portion. According to this structure, in addition to arrangement of the antenna and wiring connection with the light emitting element, wiring connection with the light emitting part of the code imaging part can be also performed by the common flexible printed circuit board. Therefore, wiring connection for providing a light emitting function and a plurality of non-contact communication functions is easily performed and easiness of assembling is enhanced.

In this embodiment, it is preferable that the card reader includes a second flexible printed circuit board which connects the camera module with the card reader main body. As described above, when wiring connection with the camera module is performed by another wiring member (second flexible printed circuit board) separated from a wiring member for connection with the light emitting element and arrangement of the antenna, imaging data from the camera module are easily connected with a control circuit for camera. Therefore, the code imaging part is easily added to a model which is provided with the antenna for NFC (short-range wireless communication) and an illuminating function by light emission.

In this embodiment, it is preferable that the cover member is provided with a flange part which is fixed to the board and a protruded part which is protruded from the flange part, the protruded part is extended in the longitudinal direction, an end on one side in the longitudinal direction of the protruded part is provided with a holding part which holds the code imaging part, and the card insertion port is opened at a position adjacent to the holding part in the longitudinal direction in a tip end face of the protruded part. According to this structure, an arrangement space of the code imaging part can be secured without changing an outer shape of the cover member.

In this embodiment, it is preferable that the code imaging part includes a holder which is disposed on an inner side of the protruded part, the camera module and the light emitting part are held by the holder in an obliquely downward posture, and the code imaging part images through an opening part provided in a tip end face of the holding part. According to this structure, a medium provided with a one-dimensional code or a two-dimensional code is easily held over the code imaging part. Further, glare of the light emitting part is less likely to be felt when a one-dimensional code or a two-dimensional code is to be read.

In this embodiment, it is preferable that the code imaging part is inclined obliquely downward. According to this structure, a medium provided with a one-dimensional code or a two-dimensional code is easily held over the code imaging part. Further, glare of the light emitting part is less likely to be felt when a one-dimensional code or a two-dimensional code is to be read.

Effects of the Invention

According to at least an embodiment of the present invention, the cover member provided with the card insertion port is formed of a light transmissive material, and the board disposed with the light emitting element is disposed on an inner side of the cover member. Therefore, a periphery of the card insertion port can be illuminated. Further, in at least an embodiment of the present invention, the code imaging part is held in the cover member at a position adjacent to the card insertion port in the longitudinal direction. In a case that the code imaging part is disposed at such a position, the code imaging part can be easily recognized and, when a one-dimensional code or a two-dimensional code is to be read, a medium is easily held over the code imaging part. Further, in a case that the code imaging part is disposed at such a position, an arrangement space of the code imaging part can be secured only by shifting a position of the slit-shaped card insertion port in the longitudinal direction and thus, there is little influence on an outer shape of the cover member. Further, structures of the board mounted with the light emitting element and the card reader main body are sufficient to change so as to only shift to a side to which the card insertion port is shifted. Therefore, there is little influence on an outer shape of the card reader, and there is little influence on an apparatus on which the card reader is mounted. Accordingly, influence of the code imaging part added to an existing card reader can be reduced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and where like elements are numbered alike in several Figures, in which.

DETAILED DESCRIPTION (Entire Structure)

Figure 1A:
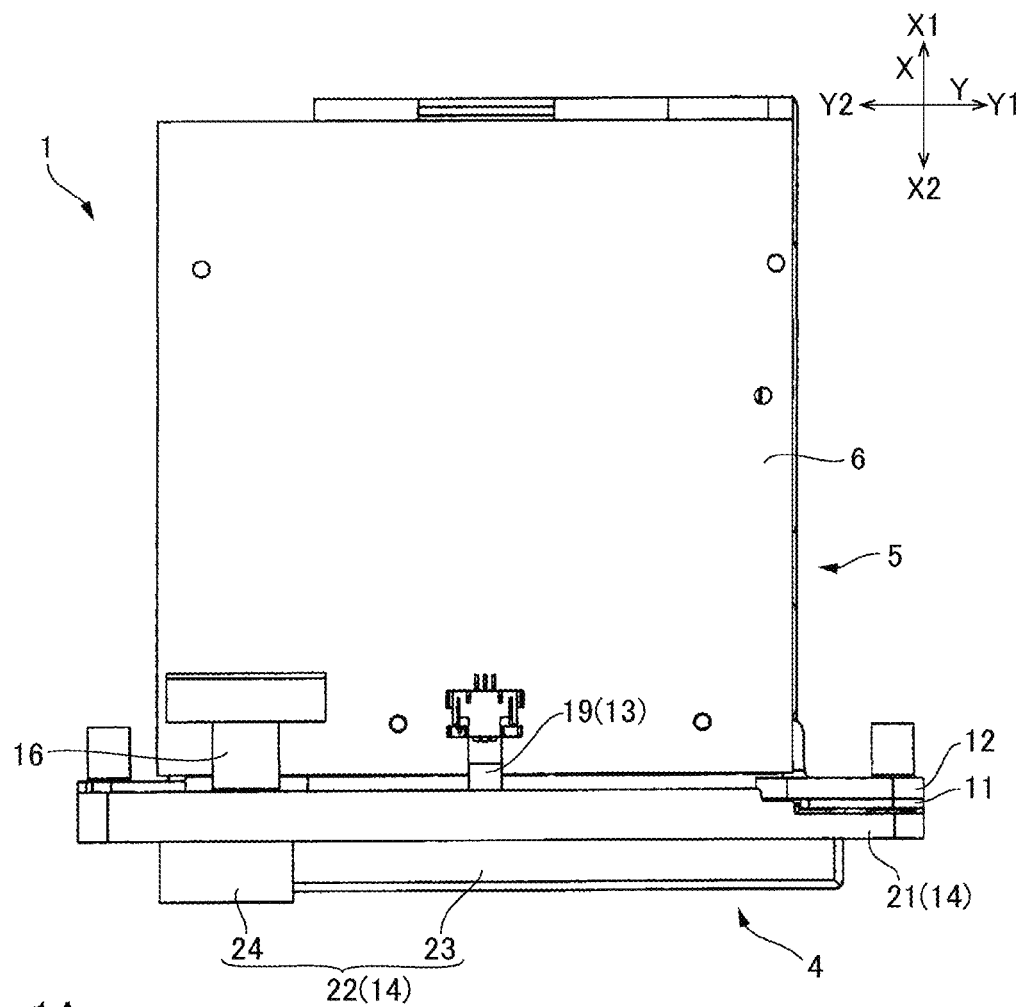
FIG. 1A and FIG. 1B are a plan view and a front view showing a card reader in accordance with an embodiment of the present invention.
Figure 1B:
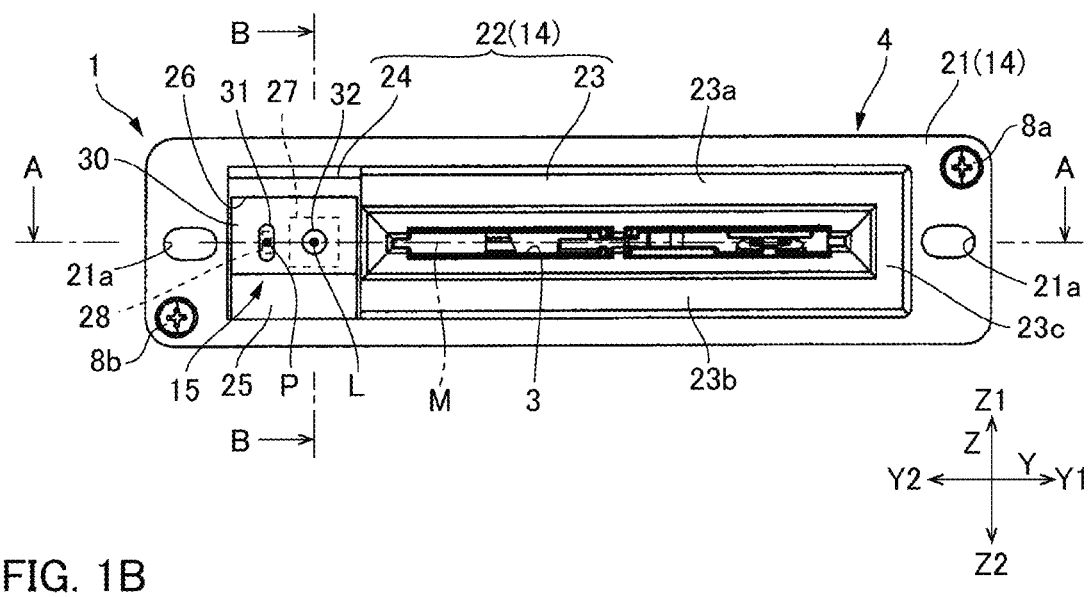
Figure 2:
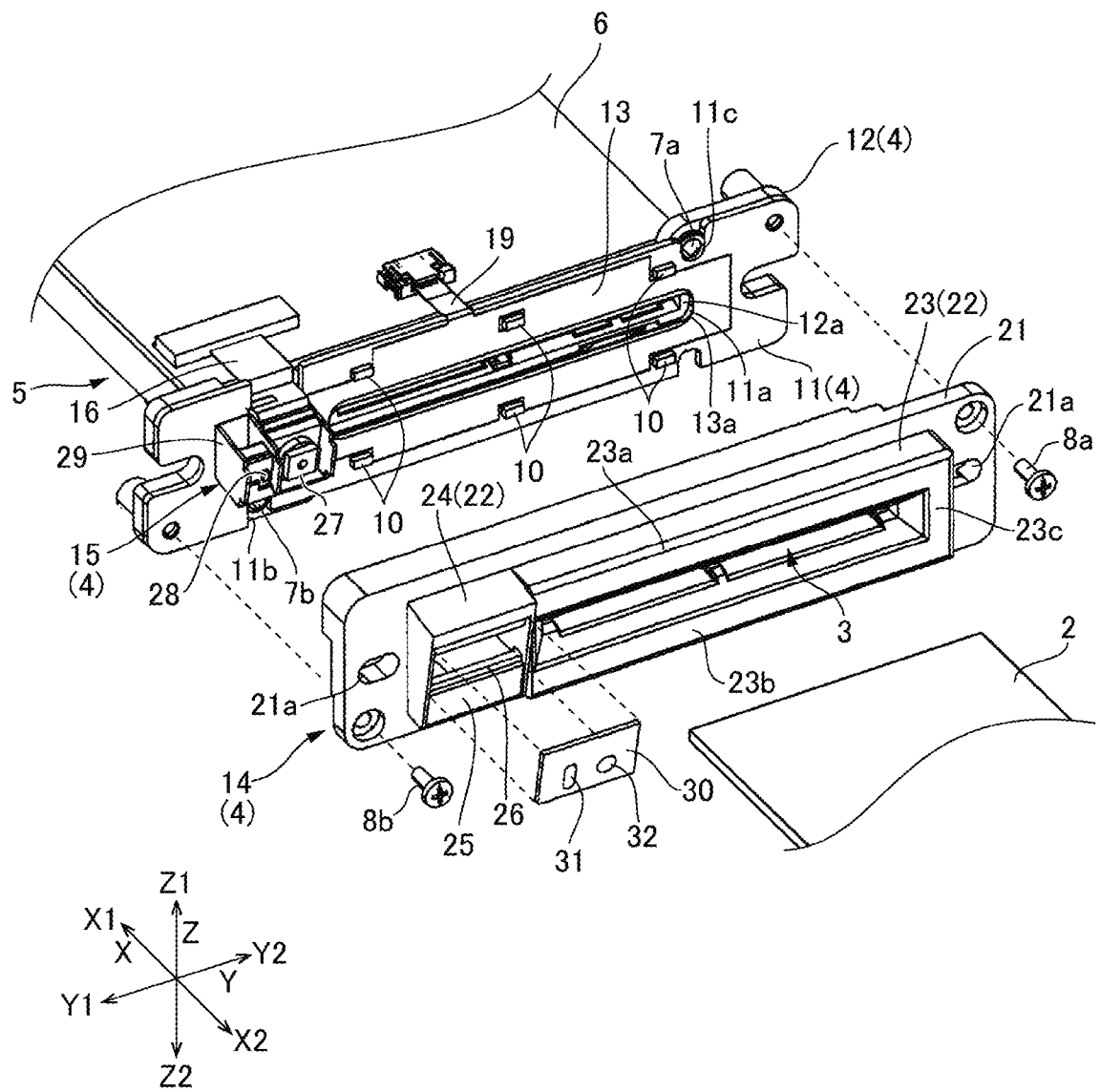
FIG. 2 is an exploded perspective view showing a card insertion part of the card reader in FIG. 1A and FIG. 1B.
Figure 3:
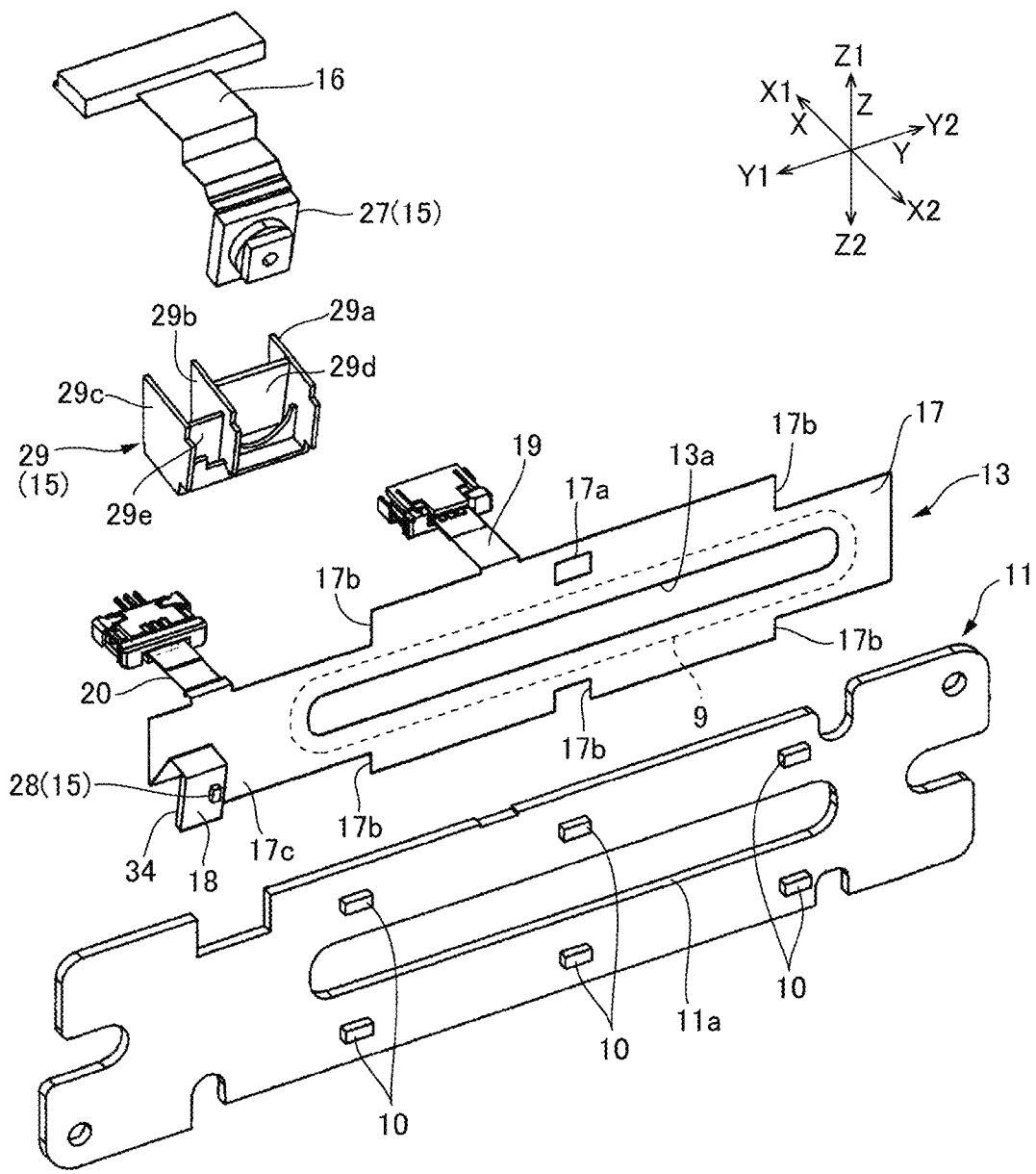
FIG. 3 is an exploded perspective view showing a rigid board, a code imaging part, a first flexible printed circuit board and a second flexible printed circuit board.

An embodiment of a card reader 1 to which the present invention is applied will be described below with reference to the accompanying drawings. FIG. 1A is a plan view showing a card reader 1 to which the present invention is applied. FIG. 1B is a front view showing the card reader 1 to which the present invention is applied. FIG. 2 is an exploded perspective view showing a card insertion part 4 of the card reader 1 in FIG. 1A and FIG. 1B. FIG. 3 is an exploded perspective view showing a rigid board 11, a code imaging part 15, a first flexible printed circuit board 13 and a second flexible printed circuit board 16.

In the present specification, three directions of "X", "Y" and "Z" are directions perpendicular to each other. The "X" direction is a front and rear direction of the card reader 1. A card 2 is inserted into the card reader 1 in an "X1" direction and is taken out from the card reader 1 in an "X2" direction. The "Y" direction is a width direction of the card reader 1, and one side in the "Y" direction is referred to as "Y1" and the other side is referred to as "Y2". The "Z" direction is a height (thickness) direction of the card reader 1, and one side in the "Z" direction is referred to as "Z1" and the other side is referred to as "Z2".

The card reader 1 shown in FIG. 1A and FIG. 1B is a device for performing reading of data recorded in a card 2 (see FIG. 2) and recording of data to the card 2. For example, the card reader 1 is mounted on a game apparatus and the like installed in a casino, a game center or the like.

A card 2 is, for example, a substantially rectangular-shaped card made of vinyl chloride whose thickness is about 0.7 to about 0.8 millimeter (mm). A rear face of a card 2 is formed with a magnetic stripe (not shown) where magnetic data are recorded. Further, the card 2 is incorporated with an IC chip, and a surface of the card 2 is formed with external connection terminals (not shown) of the IC chip. In this case, the card 2 may be formed with only one of a magnetic stripe or external connection terminals. Further, the card 2 may be a PET (polyethylene terephthalate) card whose thickness is about 0.18 to about 0.36 mm or may be a paper card having a predetermined thickness.

As shown in FIGS. 1A, FIG. 1B and FIG. 2, a card insertion port 3 into which a card 2 is to be inserted is opened at a front end (end part in the "X2" direction) of the card reader 1. The card reader 1 is provided with a card insertion part 4 formed with the card insertion port 3 and a card reader main body 5 which is formed with a card passage connected with the card insertion port 3. The card reader main body 5 includes a magnetic head, which performs reading of magnetic data recorded in a magnetic stripe of a card 2 inserted to the card passage and writing of magnetic data, an IC contact block which is contacted with external connection terminals of an IC chip of a card 2 to perform data communication with the card, and the like.

As shown in FIG. 1A, the card insertion part 4 is disposed at an end part in the "X2" direction of the card reader main body 5. An end part in the "Z1" direction of the card reader main body 5 is attached with a control circuit board 6. The control circuit board 6 is mounted with a CPU (Central Processing Unit) for controlling the card reader 1, and the like.

As shown in FIG. 2, the card insertion part 4 includes a rigid board 11 on which a plurality of light emitting elements 10 is mounted, and a base plate 12 which is disposed on the "X1" side of the rigid board 11. In this embodiment, the base plate 12 and a frame of the card reader main body 5 are integrated with each other. An insulation sheet (not shown) is disposed between the rigid board 11 and the base plate 12. The base plate 12 and the rigid board 11 are formed in a substantially rectangular flat plate shape whose long side direction is the "Y" direction. A plurality of the light emitting elements 10 is disposed on a surface on the "X2" side of the rigid board 11.

Further, the card insertion part 4 includes a first flexible printed circuit board 13 disposed on the surface on the "X2" side of the rigid board 11, a cover member 14 formed with the card insertion port 3, a code imaging part 15 held by the cover member 14, and a second flexible printed circuit board 16 connected with the code imaging part 15. The cover member 14 covers the rigid board 11, the first flexible printed circuit board 13 and the code imaging part 15 from an opposite side ("X2" direction side) to the base plate 12.

As shown in FIG. 2, the base plate 12 is provided with positioning holes 7a and 7b to which positioning protruded parts (not shown) provided in the cover member 14 are fitted, and the rigid board 11 is formed with cut-out parts 11b and 11c which are formed by cutting out portions overlapped with tip ends of the positioning holes 7a and 7b. The cover member 14 and the rigid board 11 are screwed into boss parts provided in the base plate 12 at two diagonal positions by screws 8a and 8b.

The rigid board 11, the base plate 12 and the first flexible printed circuit board 13 are respectively formed with card passage ports 11a, 12a and 13a. Further, the cover member 14 is formed with the card insertion port 3 into which a card 2 is to be inserted. The card passage ports 11a, 12a and 13a are formed in an elliptical elongated shape whose longitudinal direction is the "Y" direction and are overlapped with the card insertion port 3 in the "X" direction. The card passage ports 11a, 12a and 13a structure a card insertion path where a card 2 passes.

The light emitting element 10 is an LED which emits light toward the cover member 14. A surface on the "X2" side of the rigid board 11 is mounted with three light emitting elements 10 which are respectively arranged in the "Y" direction on the "Z1" side and the "Z2" side with respect to the card passage port 11a. On the "Z1" side and the "Z2" side with respect to the card passage port 11a, three light emitting elements 10 are respectively disposed at a center in the "Y" direction and at both ends in the "Y" direction of the card passage port 11a. The rigid board 11 is electrically connected with the control circuit board 6 of the card reader main body 5 through the first flexible printed circuit board 13. Light emission intensity of the light emitting element 10 is controlled by an LED control circuit which is mounted on the control circuit board 6.

As shown in FIG. 3, the first flexible printed circuit board 13 is provided with a first portion 17 in a flat face shape which is a little smaller than the rigid board 11, a second portion 18 connected with an end part on the "Y1" side of the first portion 17, and two third portions 19 and 20 which are bent from an edge on the "Z1" side of the first portion 17 to the "X1" side.

The first portion 17 is disposed on a surface on the "X2" side of the rigid board 11 and surrounds the card passage port 13a over the entire periphery. An NFC communication antenna 9 is provided in the first portion 17. The first portion 17 is provided with one opening part 17a which is formed by cutting out a portion overlapped with one of six light emitting elements 10 and five cut-out parts 17b which are respectively formed by cutting out portions overlapped with the remaining five light emitting elements 10 on an outer peripheral side with respect to the antenna 9 (see FIG. 3).

As shown in FIG. 3, the first portion 17 is provided with an extending part 17c which is extended to the "Y1" side with respect to the card passage port 13a. The second portion 18 is bent from an edge on the "Z2" side of the extending part 17c to the "X2" side and is connected with the code imaging part 15. The third portion 20 is bent from an edge on the "Z1" side of the extending part 17c to the "X1" side and is connected with the control circuit board 6 of the card reader main body 5. Further, the third portion 19 is bent from an edge on the "Z1" side of the first portion 17 to the "X1" side at a position near the center in the "Y" direction of the card passage port 13a and is connected with the control circuit board 6.

The cover member 14 is formed of translucent light transmissive material. In this embodiment, the cover member 14 is formed of milky white light transmissive material. In this case, a color of the cover member 14 may be a color such as gray other than milky white. As shown in FIGS. 1A, FIG. 1B and FIG. 2, the cover member 14 is provided with a frame-shaped flange part 21 in a flat plate shape and a substantially rectangular shape, and a protruded part 22 which is protruded to the "X2" direction from a center of the flange part 21. The protruded part 22 is formed in a long and thin shape in the "Y" direction and surrounds an outer peripheral side of the card insertion port 3. The light emitting elements 10 are disposed at positions overlapped with the protruded part 22 of the cover member 14.

The cover member 14 is, as described above, fixed to the base plate 12 together with the rigid board 11 by the screws 8a and 8b. The cover member 14 is provided with mounting holes 21a which penetrate through the flange part 21. When screws (not shown) passed through the mounting hole 21a are screwed into an opposite-side apparatus (for example, game apparatus) on which the card reader 1 is mounted, the card reader 1 is fixed to the opposite-side apparatus. The mounting hole 21a is an elongated hole which is long in the "Y" direction and is provided at two positions on both sides in the "Y" direction with respect to the protruded part 22. The rigid board 11 and the base plate 12 are cut out in portions overlapped with the mounting holes 21a in the "X" direction.

In the card reader 1, a surface on the "X2" side of the flange part 21 of the cover member 14 is an attaching face of the card reader 1 to the opposite-side apparatus to which the card reader 1 is attached. In a state that the card reader 1 is attached to the opposite-side apparatus, only the protruded part 22 of the cover member 14 is exposed from an opening part provided in a front panel of the opposite-side apparatus.

When the opposite-side apparatus is a game apparatus which is installed in a casino, a game center or the like, the card reader 1 is used in a state that a card 2 has been inserted into the card reader 1. When a card 2 has been inserted in the card reader 1, the light emitting elements 10 irradiate light toward the cover member 14 and a periphery of the card insertion port 3 is illuminated.

The protruded part 22 of the cover member 14 is provided with a frame part 23 which surrounds the "Z1" side, "Y2" side and "Z2" side of the card insertion port 3. The frame part 23 is provided with an upper frame part 23a extending in the "Y" direction on the "Z1" side of the card insertion port 3, a lower frame part 23b extending in the "Y" direction on the "Z2" side of the card insertion port 3, and a vertical frame part 23c which is extended in the "Z" direction on the "Y2" side of the card insertion port 3 and connects the upper frame part 23a and the lower frame part 23b with each other.

(Code Imaging Part)

Figure 4:
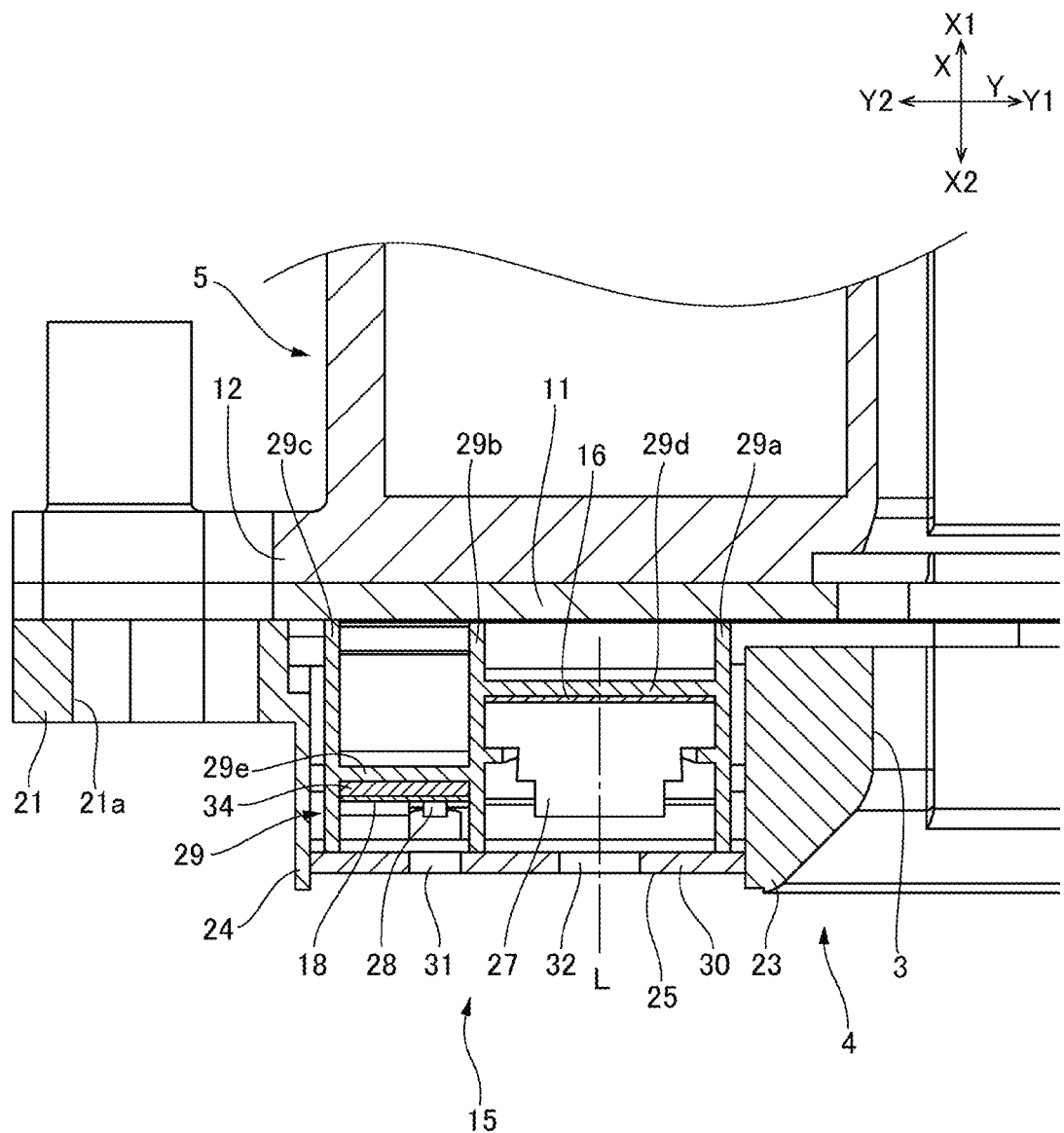
FIG. 4 is a cross-sectional view showing a code imaging part which is cut by the "X-Y" plane.
Figure 5:
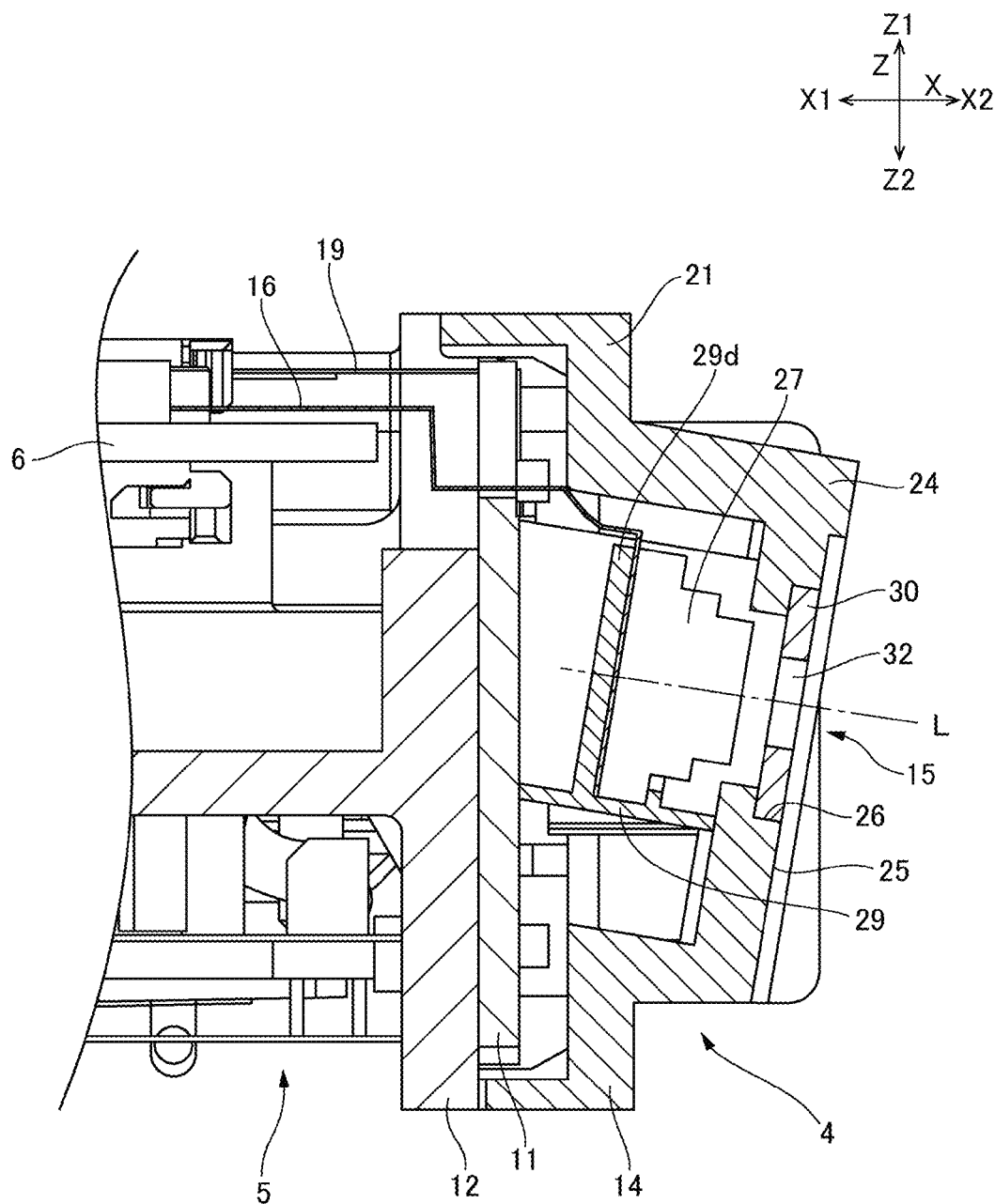
FIG. 5 is a cross-sectional view showing a code imaging part which is cut by the "X-Z" plane.

FIG. 4 is a cross-sectional view showing the code imaging part 15 which is cut by the "X-Y" plane and is cut at the "A-A" position in FIG. 1B. FIG. 5 is a cross-sectional view showing the code imaging part 15 which is cut by the "X-Z" plane and is cut at the "B-B" position in FIG. 1B. As shown in FIG. 1B and FIG. 2, the code imaging part 15 is disposed at a position adjacent to the card insertion port 3 in the "Y" direction. The code imaging part 15 images a one-dimensional code or a two-dimensional code from a medium disposed on the "X2" direction side with respect to the card insertion part 4. When the "Z1" direction side is an upper side and the "Z2" direction is a lower side, as shown in FIG. 2 and FIG. 5, the code imaging part 15 is inclined obliquely downward.

As shown in FIGS. 1A, FIG. 1B and FIG. 2, in the cover member 14, an end part on the "Y1" side of the protruded part 22 is provided with a holding part 24 which holds the code imaging part 15. The holding part 24 is connected with ends on the "Y1" side of the upper frame part 23a and the lower frame part 23b and surrounds the "Y1" side of the card insertion port 3. A tip end face 25 on the "X2" side of the holding part 24 is an inclined face which is inclined obliquely downward with respect to the "Y-Z" face which is a vertical plane. The code imaging part 15 is accommodated on an inner side of the holding part 24 and images an obliquely lower side through a rectangular opening part 26 provided in the tip end face 25.

The code imaging part 15 includes a camera module 27 and a light emitting part 28, a holder 29 which holds the camera module 27 and the light emitting part 28, and a cover plate 30 which is fitted to the opening part 26 provided in the tip end face 25 of the holding part 24. The cover plate 30 is provided with a first light transmission part 31 which faces the light emitting part 28, and a second light transmission part 32 which faces the camera module 27. The first light transmission part 31 and the second light transmission part 32 are made of transparent material. In accordance with an embodiment of the present invention, the entire cover plate 30 may be formed of transparent material.

The camera module 27 and the light emitting part 28 are arranged side by side in the "Y" direction. More specifically, an optical axis "L" of the camera module 27 and a center "P" of the light emitting part 28 are located on a center line "M" which passes a center in the "Z" direction of the card insertion port 3 and extends in the "Y" direction (see FIG. 1B). The light emitting part 28 is disposed on an opposite side to the card insertion port 3 with respect to the camera module 27.

As shown in FIG. 3 and FIG. 4, the holder 29 is provided with a first side plate 29a, a second side plate 29b and a third side plate 29c which are parallel to the "X-Z" plane. A support plate 29d which supports the camera module 27 from a rear face side is disposed between the first side plate 29a and the second side plate 29b. A support plate 29e which supports the light emitting part 28 from a rear face side is disposed between the second side plate 29b and the third side plate 29c. The support plates 29d and 29e are inclined with respect to the "Y-Z" plane and, when the "Z1" direction is an upper side and the "Z2" direction is a lower side, the support plates 29d and 29e are inclined so as to face an obliquely lower side. The camera module 27 is fixed to the support plate 29d and thereby, the camera module 27 is held in a posture that the optical axis "L" is directed obliquely downward (see FIG. 5). The light emitting part 28 is fixed to the support plate 29e and thereby, the light emitting part 28 is held in a posture so as to face obliquely downward similarly to the camera module 27. The holder 29 is formed of a conductive member. Specifically, the holder 29 is formed of resin having conductivity. The holder 29 may be formed of a member coated with metal or material having conductivity, or the like. A rear end of the holder 29 is contacted with a ground terminal (not shown) of the rigid board 11. Further, as shown in FIG. 4, a front end of the holder 29 is protruded to a front side ("X2" direction) with respect to the camera module 27 and the light emitting part 28. Therefore, for example, in a case that a user who is charged with electricity has brought a card 2 close to the card insertion part 4, even when the card 2 has been charged with static electricity, the static electricity charged in the card 2 is flowed to the ground terminal of the rigid board 11 through the holder 29. Therefore, the static electricity is prevented from being discharged to electronic components which are mounted on the card insertion part 4 (camera module 27, light emitting part 28, light emitting elements 10, elements mounted on the rigid board, and the like) and thus, malfunction, breakage and the like of the electronic components due to static electricity can be avoided.

The light emitting part 28 is a light emitting element such as an LED. The light emitting part 28 is connected with the second portion 18 of the first flexible printed circuit board 13. The light emitting part 28 is connected with the control circuit board 6 of the card reader main body 5 through wiring lines provided in the second portion 18 and the third portion 20. The light emitting part 28 is fixed to the support plate 29e through a reinforcing plate 34 which is fixed to a rear face of the second portion 18. Light of the light emitting part 28 is irradiated from the first light transmission part 31 toward a medium which is disposed on the "X2" direction side with respect to the cover plate 30.

A bottom part of the camera module 27 is connected with the second flexible printed circuit board 16. The camera module 27 is connected with the control circuit board 6 of the card reader main body 5 through wiring lines provided in the second flexible printed circuit board 16. The camera module 27 images a one-dimensional code or a two-dimensional code attached to a medium through the second light transmission part 32.

(Principal Effects in this Embodiment)

As described above, the card reader 1 in this embodiment includes the card reader main body 5, the rigid board 11 which is fixed to the card reader main body 5, the light emitting element 10 which is disposed on a surface of the rigid board 11, the light transmissive cover member 14 which covers the rigid board 11 from an opposite side with respect to the card reader main body 5, and the code imaging part 15 which images a one-dimensional code or a two-dimensional code. The cover member 14 is provided with the card insertion port 3 which is extended in the "Y" direction. The code imaging part 15 is held by the cover member 14 and is disposed at a position adjacent to the card insertion port 3 in the "Y" direction.

In this embodiment, the cover member 14 provided with the card insertion port 3 is formed of a light transmissive material, and the rigid board 11 disposed with the light emitting elements 10 is disposed on an inner side of the cover member 14. The light emitting elements 10 are disposed so as to surround the card insertion port 3. Therefore, a periphery of the card insertion port 3 can be illuminated.

Further, in this embodiment, the code imaging part 15 is held at a position adjacent to the card insertion port 3 in the "Y" direction (longitudinal direction of the card insertion port 3) in the cover member 14. Therefore, the code imaging part 15 can be easily recognized and, when a one-dimensional code or a two-dimensional code is to be read, a medium is easily held over the code imaging part 15. Further, when the code imaging part 15 is provided at a position adjacent to the card insertion port 3, an arrangement space of the code imaging part 15 is easily secured without affecting an outer shape of the cover member 14. In other words, an arrangement space of the code imaging part 15 can be secured at a side of the card insertion port 3 by shifting the card insertion port 3 in a slit shape in the longitudinal direction and thus, an outer shape of the cover member 14 is hardly affected by providing the code imaging part 15. Further, structures of the rigid board 11 mounted with the light emitting elements 10 and the card reader main body 5 are sufficient to change so that arrangement of parts is shifted to a side to which the card insertion port 3 is shifted. Therefore, there is little influence on an outer shape of the card reader 1 and an apparatus (for example, game apparatus) on which the card reader 1 is mounted. Accordingly, the code imaging part 15 is easily added to an existing card reader 1 by a design change.

In the card reader 1 in this embodiment, the code imaging part 15 includes the camera module 27 and the light emitting part 28. The light emitting part 28 and the camera module 27 are arranged side by side in the "Y" direction and thus, a dimension in the "Z" direction of the code imaging part 15 is less likely to become large. Therefore, there is little influence on an outer shape of the cover member 14 whose dimension in the "Z" direction is small due to addition of the code imaging part 15.

In this embodiment, the light emitting part 28 of the code imaging part 15 is disposed on an opposite side in the "Y" direction to the card insertion port 3 with respect to the camera module 27. As described above, in a case that the light emitting part 28 is disposed on a separated side from the card insertion port 3 with respect to the camera module 27, when a user in front of the card insertion port 3 utilizes the code imaging part 15, the user is less likely to feel dazzled by the light of the light emitting part 28.

In this embodiment, the optical axis "L" of the camera module 27, the center "P" of the light emitting part 28, and the center of the card insertion port 3 are arranged on the same straight line. As described above, the card insertion port 3, the camera module 27 and the center "P" in the "Z" direction of the light emitting part 28 are aligned with each other, a dimension in the "Z" direction of the cover member 14 is less likely to increase. For example, in this embodiment, these structures are provided in the protruded part 22 of the cover member 14 and thus, a height in the "Z" direction of the protruded part 22 is less likely to increase. When the card reader 1 is to be mounted on an apparatus such as a game apparatus, only the protruded part 22 of the cover member 14 is attached so as to be exposed. Therefore, a size of an outer shape of the protruded part 22 is prevented from being largely increased and thus, an influence on an apparatus on which the card reader 1 is mounted can be reduced.

The card reader 1 in this embodiment includes the non-contact communication antenna 9 which is disposed on a surface of the rigid board 11. Therefore, in addition to reading of a one-dimensional code and a two-dimensional code, reading of information by NFC (short-range wireless communication) can be performed and thus, the card reader 1 is highly convenient.

The card reader 1 in this embodiment includes the first flexible printed circuit board 13 provided with the first portion 17 which surrounds the card passage port 11a provided in the rigid board 11. The non-contact communication antenna 9 is provided in the first portion 17 and thus, the antenna 9 is easily arranged.

In this embodiment, the light emitting elements 10 for illumination are connected with the control circuit board 6 provided in the card reader main body 5 through the first flexible printed circuit board 13. Therefore, arrangement of the antenna 9 and wiring connections with the light emitting elements 10 for illumination can be performed by the common flexible printed circuit board and thus, wiring connection is easily performed, and easiness of assembling is enhanced.

Further, the first flexible printed circuit board 13 is provided with the second portion 18 which connects the first portion 17 with the light emitting part 28 and the third portion 19 connected with the card reader main body 5, and the light emitting part 28 of the code imaging part 15 is connected with the control circuit board 6 through the second portion 18 and the third portion 19. Therefore, in addition to arrangement of the antenna 9 and wiring connections with the light emitting elements 10, wiring connection with the light emitting part 28 of the code imaging part 15 can be also performed by the common flexible printed circuit board and thus, wiring connection is easily performed, and easiness of assembling is enhanced.

The card reader 1 in this embodiment includes the second flexible printed circuit board 16 which connects the camera module 27 with the card reader main body 5. When wiring connection with the camera module 27 is performed by another wiring member (second flexible printed circuit board 16) separated from a wiring member for connection with the light emitting elements 10 and arrangement of the antenna 9, imaging data from the camera module 27 are easily connected with a control circuit for camera. Therefore, the code imaging part 15 is easily added to a model which is provided with the antenna 9 for NFC (short-range wireless communication) and an illuminating function by light emission.

In this embodiment, the cover member 14 is provided with the flange part 21 which is fixed to the rigid board 11 and the protruded part 22 which is protruded from the flange part 21. The protruded part 22 is extended in the "Y" direction, and the holding part 24 which holds the code imaging part 15 is provided at an end in the "Y1" direction of the protruded part 22, and the card insertion port 3 is opened at a position adjacent to the holding part 24 on the "Y2" direction side in a tip end face of the protruded part 22. According to this structure, an arrangement space of the code imaging part 15 can be secured without largely changing an outer shape of the cover member 14 and the protruded part 22.

In this embodiment, the code imaging part 15 is inclined obliquely downward and thus, a medium provided with a one-dimensional code, or a two-dimensional code is easily held over the code imaging part 15. Further, glare of the light emitting part 28 is less likely to be felt when a one-dimensional code or a two-dimensional code is to be read. In other words, the code imaging part 15 in this embodiment includes the holder 29 which is disposed on an inner side of the protruded part 22, and the camera module 27 and the light emitting part 28 are held in an obliquely downward posture by the holder 29, and the camera module 27 images through the opening part 26 provided in the tip end face 25 of the holding part 24. According to this structure, the camera module 27 and the light emitting part 28 are disposed obliquely downward.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader comprising:
a card reader main body;
a board which is fixed to the card reader main body;
a light emitting element which is disposed on a surface of the board;
a cover member which is made of light transmissive material and covers the board from an opposite side to the card reader main body; and
a code imaging part which images a one-dimensional code or a two-dimensional code,
wherein the cover member is formed with a card insertion port, and
wherein the code imaging part is held by the cover member and is disposed at a position adjacent to the card insertion port in a longitudinal direction of the card insertion port.

2. The card reader according to claim 1, wherein
the code imaging part includes a camera module and a light emitting part, and
the light emitting part and the camera module are arranged in the longitudinal direction.

3. The card reader according to claim 2, wherein the light emitting part is disposed on an opposite side in the longitudinal direction to the card insertion port with respect to the camera module.

4. The card reader according to claim 2, wherein an optical axis of the camera module, a center of the light emitting part and a center of the card insertion port are aligned on a same straight line.

5. The card reader according to claim 2, further comprising a non-contact communication antenna which is disposed on the surface of the board.

6. The card reader according to claim 5, further comprising a first flexible printed circuit board which is provided with a first portion surrounding a card passage port that is provided in the board,
wherein the non-contact communication antenna is provided in the first portion.

7. The card reader according to claim 6, wherein the light emitting element is connected with a control circuit board provided in the card reader main body through the first flexible printed circuit board.

8. The card reader according to claim 7, wherein
the first flexible printed circuit board is provided with a second portion, which connects the first portion with the light emitting part, and a third portion which is connected with the card reader main body, and
the light emitting part is connected with the control circuit board through the second portion and the third portion.

9. The card reader according to claim 6, further comprising a second flexible printed circuit board which connects the camera module with the card reader main body.

10. The card reader according to claim 2, wherein
the cover member is provided with a flange part which is fixed to the board and a protruded part which is protruded from the flange part,
the protruded part is extended in the longitudinal direction,
an end on one side in the longitudinal direction of the protruded part is provided with a holding part which holds the code imaging part, and
the card insertion port is opened at a position adjacent to the holding part in the longitudinal direction in a tip end face of the protruded part.

11. The card reader according to claim 10, wherein
the code imaging part comprises a holder which is disposed on an inner side of the protruded part,
the camera module and the light emitting part are held by the holder in an obliquely downward posture, and
the camera module images through an opening part provided in a tip end face of the holding part.

12. The card reader according to claim 11, wherein the holder is formed of a conductive member.

13. The card reader according to claim 1, wherein the code imaging part is inclined obliquely downward.

* * * * *